United States Patent
Rajakarunanayake (10) Patent No.: US 7,890,986 B2
(45) Date of Patent: Feb. 15, 2011

(54) SYSTEM AND METHOD FOR REDUCING CHANNEL CHANGE TIME

(75) Inventor: Yasantha Nirmal Rajakarunanayake, San Ramon, CA (US)

(73) Assignee: Broadcom Corporation, Irvine, CA (US)

( * ) Notice: Subject to any disclaimer, the term of this patent is extended or adjusted under 35 U.S.C. 154(b) by 516 days.

(21) Appl. No.: 11/765,047

(22) Filed: Jun. 19, 2007

(65) Prior Publication Data

US 2008/0320537 A1  Dec. 25, 2008

(51) Int. Cl.
*H04N 7/173* (2006.01)

(52) U.S. Cl. .......................................... 725/93; 725/116

(58) Field of Classification Search ....................... None
See application file for complete search history.

(56) References Cited

U.S. PATENT DOCUMENTS

| | | | |
|---|---|---|---|
| 7,376,155 B2 * | 5/2008 | Ahn et al. ................... 370/503 |
| 2003/0200551 A1 * | 10/2003 | Kang ........................ 725/120 |
| 2006/0174287 A1 * | 8/2006 | Maeda ........................ 725/80 |
| 2007/0201463 A1 * | 8/2007 | Morita ....................... 370/389 |
| 2007/0211718 A1 * | 9/2007 | Kang et al. ................. 370/389 |
| 2008/0120637 A1 * | 5/2008 | Deiss ......................... 725/32 |

* cited by examiner

*Primary Examiner*—Andrew Y Koenig
*Assistant Examiner*—Rong Le
(74) *Attorney, Agent, or Firm*—McAndrews, Held & Malloy, Ltd.

(57) ABSTRACT

Presented herein are system(s) and method(s) for reducing channel change time. In one embodiment, there is presented a method for transmitting data. The method comprises receiving a request for video data from a client; transmitting a transaction header to the client, said transaction header comprising media metadata; and transmitting compressed video data to the client after transmitting the transaction header.

6 Claims, 5 Drawing Sheets

SYSTEM AND METHOD FOR REDUCING CHANNEL CHANGE TIME

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The channel change time in digital TV is usually slower than in analog TV because of various fundamental factors with the technology involved. It is not unusual to have to wait 3-4 seconds before channel change completes. This means when users are browsing channels at random, it is a very slow process because several seconds may elapse before a final picture is decoded and shown on TV, from the initial activation of the remote control.

Further limitations and disadvantages of conventional and traditional approaches will become apparent to one of skill in the art through comparison of such systems with embodiments presented in the remainder of the present application with reference to the drawings.

BRIEF SUMMARY OF THE INVENTION

Aspects of the present invention may be found in system(s), method(s), and apparatus for reducing channel change times, substantially as shown in and/or described in connection with at least one of the figures, as set forth more completely in the claims.

These and other advantages and novel features of the present invention, as well as illustrated embodiments thereof will be more fully understood from the following description and drawings.

DETAILED DESCRIPTION OF THE INVENTION

Figure 1:
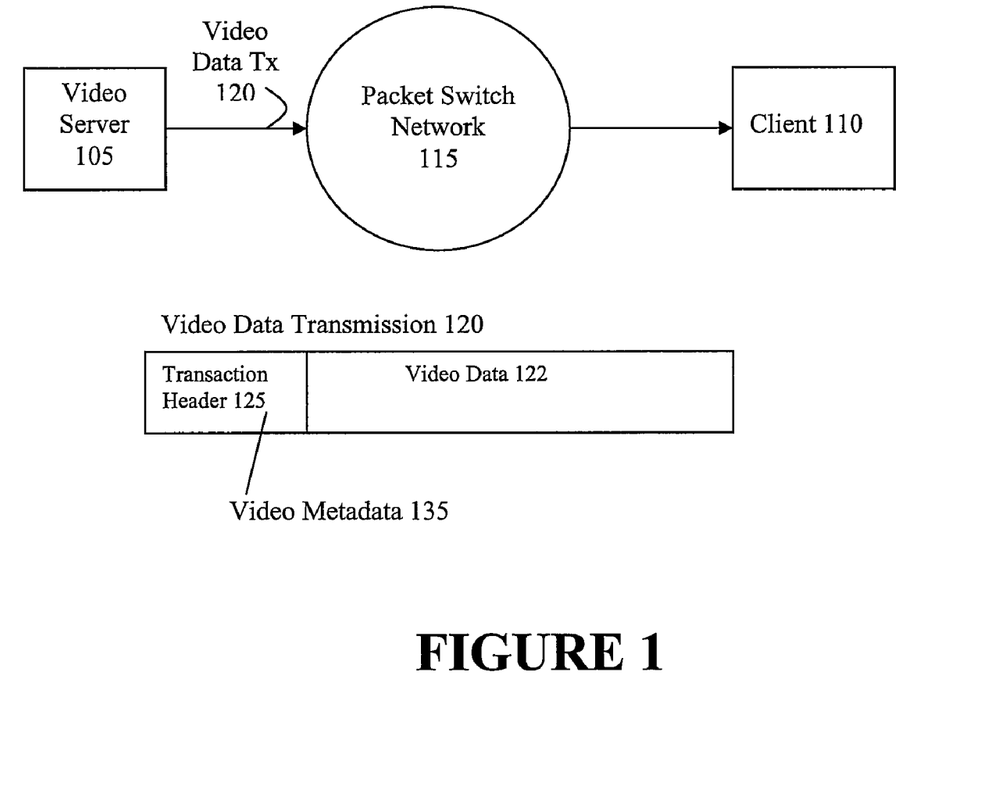
FIG. 1 is an exemplary network in accordance with an embodiment of the present invention.

Referring now to FIG. 1, there is illustrated a block diagram describing an exemplary system 100 for transmitting data in accordance with an embodiment of the present invention. The system 100 comprises a video server 105, a client 110, and a packet switched network 115.

The packet switched network 115 can comprise a variety of networks such as, for example, the internet, or a combination of networks that includes the internet.

The video server 105 transmits video data 120 to any number of clients over the packet switched network 115. The video server 105 can transmit the video data 120, for example, responsive to receiving a request from a client, such as client 110. The video data 120 can be compressed according to a particular standard. Additionally, the video data 120 can be transmitted as a set of packets or as a stream. "Video data" shall refer to both compressed and uncompressed video data, as well as to packetized video data or a stream of video data.

The video server 105 provides the video data to the client 110 by transmitting a transaction header 125 followed by the video data 120. When the client 110 receives the video data 120, the client 110 may need to make a number of initial determinations prior to displaying the video content. This can cause a delay between the time the video content is selected and the beginning of the display. This can be particularly troublesome while the user is "channel surfing".

To assist the client 110, the server 105 inserts a number of media metadata parameters 135 in the transaction header 125. The media metadata 135 can be used by the client to make the initial determinations faster and thereby reduce the time delay prior to displaying the video data content.

The media metadata can comprise, for example, parameters indicating the compression standard and version, time stamps, Video and Audio Program IDs, Video and Audio encoding types, Duration and other information such as First PTS (Presentation Timestamp), and Optional Encryption parameters describing the encryption algorithms used.

Figure 2:
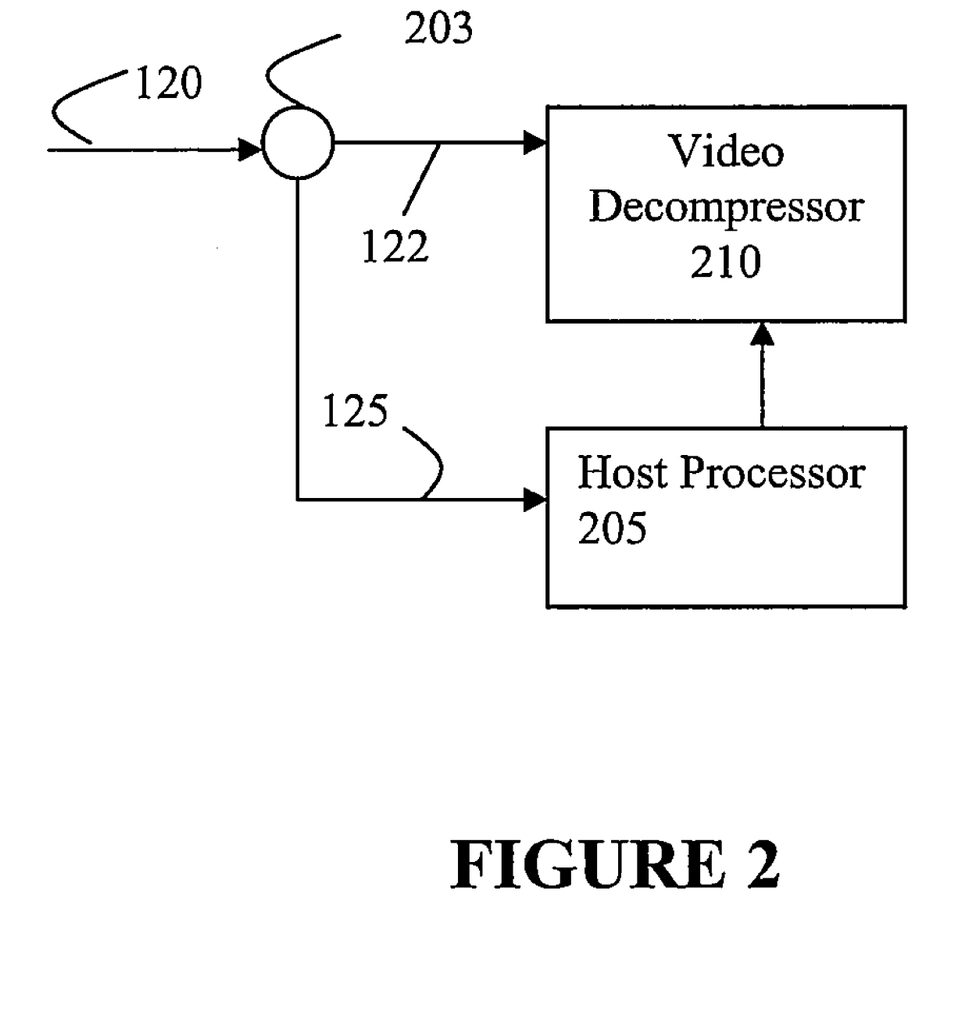
FIG. 2 is a block diagram of an exemplary client in accordance with an embodiment of the present invention.

Referring now to FIG. 2, there is illustrated a block diagram describing an exemplary client 110 in accordance with an embodiment of the present invention. The client 110 comprises an input 203, host or other processor 205, and a video decompressor 210. The input 203 receives the transaction header 125 and the compressed data 130. The host or other processor 203 receives the transaction header 125 and retrieves the media metadata. The host or other processor 205 uses the media metadata to configure the video decompressor 210. The video decompressor 210 then proceeds to decompress the compressed video data.

Aspects of the present invention will now be described in the context of internet video with MPEG2 compression. It is noted however, that the present invention can be used with a variety of standards. Also Audio and MPEG4-Part-10 (AVC) encoded video. Additionally, certain embodiments of the present invention can be used with a variety of audio compression standards, such as MP3.

Figure 3:
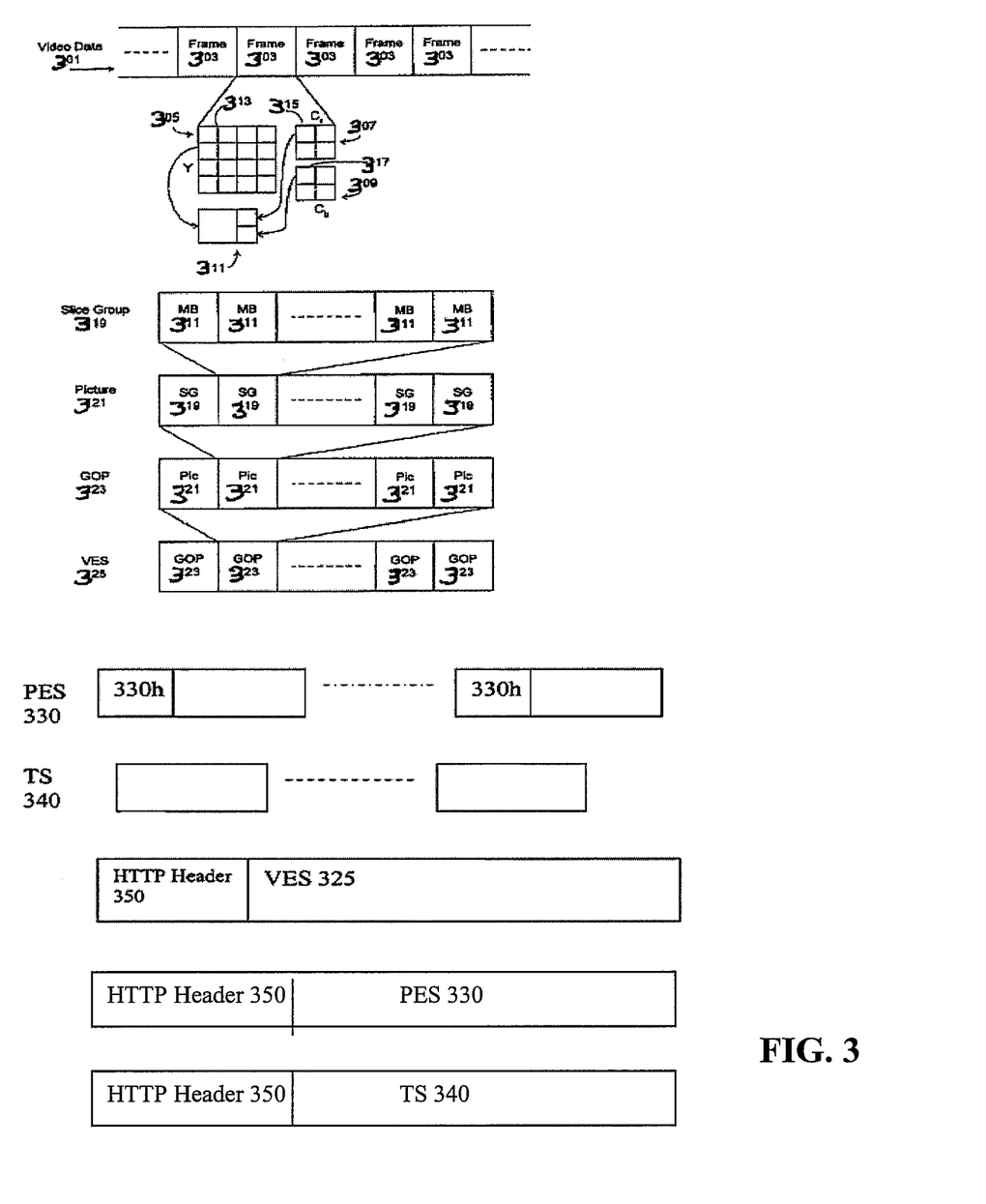
FIG. 3 is a block diagram of video data encoded in accordance with an embodiment of the present invention.

FIG. 3 illustrates a block diagram of an exemplary Moving Picture Experts Group (MPEG) encoding process of video data 301, in accordance with an embodiment of the present invention. The video data 301 comprises a series of frames 303. Each frame 303 comprises two-dimensional grids of luminance Y, 305, chrominance red Cr, 307, and chrominance blue $C_b$, 309, pixels. The two-dimensional grids are divided into 8×8 blocks, where a group of four blocks or a 16×16 block 313 of luminance pixels Y is associated with a block 315 of chrominance red $C_r$, and a block 317 of chrominance blue $C_b$ pixels. The block 313 of luminance pixels Y, along with its corresponding block 315 of chrominance red pixels $C_r$, and block 317 of chrominance blue pixels $C_b$ form a data structure known as a macroblock 311. The macroblock 311 also includes additional media metadata, including motion vectors, explained hereinafter. Each macroblock 311 represents image data in a 16×16 block area of the image.

The data in the macroblocks 311 is compressed in accordance with algorithms that take advantage of temporal and spatial redundancies. For example, in a motion picture, neighboring frames 303 usually have many similarities. Motion causes an increase in the differences between frames, the difference being between corresponding pixels of the frames, which necessitate utilizing large values for the transformation from one frame to another. The differences between the frames may be reduced using motion compensation, such that the transformation from frame to frame is minimized. The idea of motion compensation is based on the fact that when an object moves across a screen, the object may appear in different positions in different frames, but the object itself does not change substantially in appearance, in the sense that the pixels comprising the object have very close values, if not the same, regardless of their position within the frame. Measuring and recording the motion as a vector can reduce the picture differences. The vector can be used during decoding to shift a macroblock 311 of one frame to the appropriate part of another frame, thus creating movement of the object. Hence, instead of encoding the new value for each pixel, a block of pixels can be grouped, and the motion vector, which determines the position of that block of pixels in another frame, is encoded.

Accordingly, most of the macroblocks 311 are compared to portions of other frames 303 (reference frames). When an appropriate (most similar, i.e. containing the same object(s)) portion of a reference frame 303 is found, the differences between the portion of the reference frame 303 and the macroblock 311 are encoded. The location of the portion in the reference frame 303 is recorded as a motion vector. The encoded difference and the motion vector form part of the data structure encoding the macroblock 311. In the MPEG-2 standard, the macroblocks 311 from one frame 303 (a predicted frame) are limited to prediction from portions of no more than two reference frames 303. It is noted that frames 303 used as a reference frame for a predicted frame 303 can be a predicted frame 303 from another reference frame 303.

The macroblocks 311 representing a frame are grouped into different slice groups 319. The slice group 319 includes the macroblocks 311, as well as additional media metadata describing the slice group. Each of the slice groups 319 forming the frame form the data portion of a picture structure 321. The picture 321 includes the slice groups 319 as well as additional parameters that further define the picture 321.

The media metadata may include, for example, a picture structure indicator (frame/top-field/bottom-field), a progressive picture sequence flag (usually comes in transport layer), a progressive frame flag, pan-scan vectors, an aspect ratio, a decode and display horizontal size parameter, a decode and display vertical size parameter, a top field first parameter, and a repeat first field parameter. It is noted that in varying standards there may be additional or less parameters.

Other parameters may also be functions of defined parameters. For example, the Still Picture Interpolation Mode (SPIM) is a function of the picture structure indicator and the progressive frame/progressive sequence flag. The SPIM represents the display interpolation mode to be used for a still picture and Personal Video Recording (PVR) application such as slow motion when real time decode is turned off. The SPIM controls the way a static frame picture can be displayed onto a screen, for example when a user wishes to pause on a certain frame or when the encoders encode the presentation time stamps of pictures in stream such that decoders are forced to display one frame repetitively. These actions can include displaying the last field, displaying the last displayed top and bottom field pair alternatively, and down-converting the entire frame lines to either top-field or bottom field. The amount of motion between two fields of a frame determines which SPIM mode gives the best visual quality.

Another example, the motion picture interpolation mode (MPIM) is also a function of the picture structure indicator, progressive frame flag, and progressive sequence flag. The MPIM is a one-bit value used while displaying moving pictures. If the bit is set, then a complete progressive frame is output onto the screen instead of breaking it into top and bottom fields. If the bit is reset, then the top or bottom field is sent depending on if the display hardware requires the top or the bottom field.

The progressive frame parameter indicates whether the picture has been encoded as a progressive frame. If the bit is set, the picture has been encoded as a progressive frame. If the bit is not set, the picture has been encoded as an interlaced frame.

The picture structure parameter specifies the picture structure corresponding to the image buffer. Pan scan vectors specify the displayable part of the picture. The aspect ratio indicates the aspect ratio of the image buffer.

The decode and display horizontal size parameters indicate the decoded and the displayable horizontal sizes of the image buffer, respectively.

The top field first parameter is a one-bit parameter that indicates for an interlaced sequence whether the top field should be displayed first or the bottom field should be displayed first. When set, the top field is displayed first, while when cleared, the bottom field is displayed first.

The repeat first field is a one-bit parameter that specifies whether the first displayed field of the picture is to be redisplayed after the second field, for an interlaced sequence. For progressive sequence, the repeat first field forms a two-bit binary number along with the top field first parameter specifying the number of times that a progressive frame should be displayed.

The pictures are then grouped together as a group of pictures (GOP) 323. The GOP 323 also includes additional media metadata further describing the GOP. Groups of pictures 323 are then stored, forming what is known as a video elementary stream (VES) 325. The VES 325 is then packetized to form a packetized elementary stream PES. The PES comprises PES packets 330. PES packets 330 comprise a header 330h which includes additional, such as, for example, Presentation Time Stamp PTS, or Decode Time Stamp DTS. The PES can be carried in the payload of transport packets 340. The transport packets 340 have headers that include additional media metadata, such as a Video PID. The transport packets can be multiplexed with other transport packets carrying other content, such as another video elementary stream 325 or an audio elementary stream.

The video elementary stream VES 325 can be provided by a video server 105 to a client 110 over the internet by transmitting a hypertext transmission protocol (HTTP) header 350, followed by the video elementary stream VES 325. It is noted that the VES 325 can be provided by as a stream, by the PES, or by transport packets 340.

The client can be a multi-media client that separates Audio and Video parts of the binary stream (multiplex), and extract parameters for proper decoding. Also additional meta data items can be transmitted by the server to the client as well, such as duration, Ratings (PG, PG-13 etc., Close Caption Types supported, Primary and Secondary languages, etc.). For example, placement of PSI (Program Specific Information in MPEG TS) in the elementary stream or transport packets requires the client to progressively extract a metadata tree. Such packets are intersperse in the normal packet flow, and it takes time to acquire these packets and determine proper information. However, placement of PSI in the HTTP header provides this information to client before the first video/audio data.

As noted above, when the client 110 receives the PES or TS stream, the client 110 may need to make a number of initial determinations prior to displaying the video content of VES 325 which can cause a delay between the time the video content is selected and the beginning of the display. To assist the client 110, the server 105 inserts certain media metadata in the HTTP header 350. The media metadata can be used by the client 110 to make the initial determinations faster and thereby reduce the time delay prior to displaying the video data content.

For example, the HTTP header 350 can include the following:

```
HTTP/1.1 200 OK
Content-Type: video/mpeg
Date: Sat, 01 Jan 2000 00:05:22 GMT
Connection: keep-alive
BCM-Video-PID: 0x31
BCM-Video-Type: 0x2
BCM-Pcr-PID: 0x34
BCM-Audio-PID: 0x34
BCM-Audio-Type: 0x81
BCM-First-PTS: 0x12344543
BCM-MediaDuration: 600.0
BCM-CA-PID: 0x19
BCM-Crypto-Info: 3DES;
Accept-Ranges: bytes
Content-Length: 12345678
Content-Range: bytes 0-12345677/12345678
ContentFeatures.dlna.org: DLNA.ORG_PN=MPEG_TS_NTSC;
DLNA_ORG_OP=10; DLNA_ORG_PS="-64,-32,-16,-8,
-4,4,16,32,64"
Server: Linux/2.x.x, UPnP/1.0, Broadcom UPnP SDK/1.0
```

The fields "BCM-Video-PID: 0x31", "BCM-Video-Type: 0x2", "BCM-Pcr-PID: 0x34", "BCM-Audio-PID: 0x34", "BCM-Audio-Type: 0x81", "BCM-First-PTS: 0x12344543", "BCM-MediaDuration: 600.0", "BCM-CA-PID: 0x19" and "BCM-Crypto-Info: 3DES" are the media metadata 135. The client 110 can use any of the foregoing parameters to make the initial determinations prior to displaying the video content.

Figure 4:
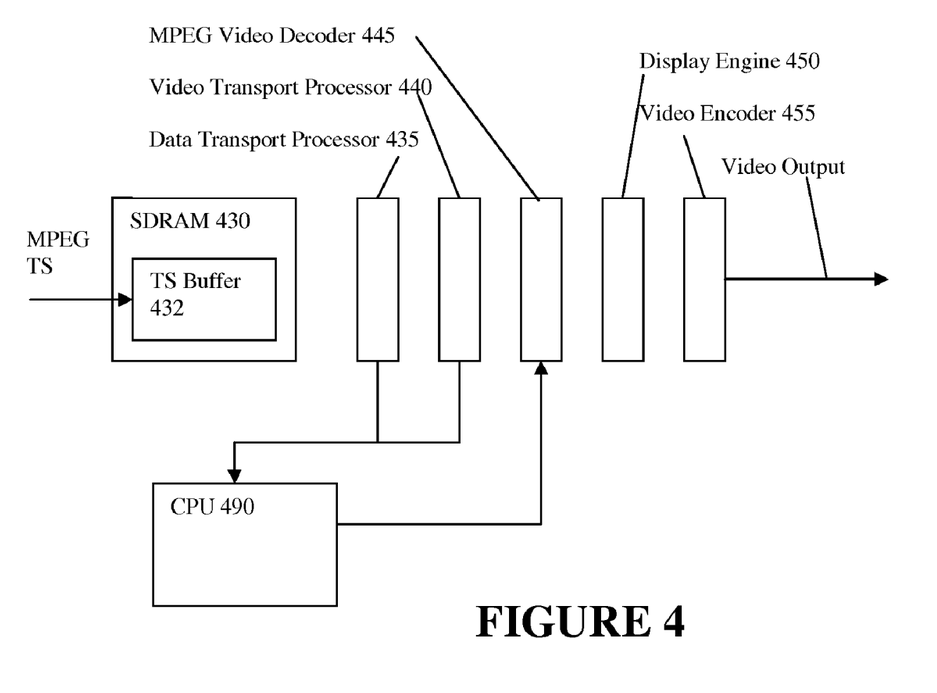
FIG. 4 is a block diagram of an exemplary video decoder in accordance with an embodiment of the present invention.

Referring now to FIG. 4, there is illustrated a block diagram of a decoder configured in accordance with certain aspects of the present invention. A processor, that may include a CPU 490, reads the HTTP header 350 and reads an MPEG transport stream into a transport stream buffer 432 within an SDRAM 430. The data is output from the transport stream buffer 432 and is then passed to a data transport processor 435. The data transport processor then demultiplexes the MPEG transport stream into its preliminary elementary stream constituents and passes the audio transport stream to an audio decoder 460 and the video transport stream to a video transport processor 440. The video transport processor 440 converts the video transport stream into a video elementary stream and transports the video elementary stream to an MPEG video decoder 445. The video elementary stream includes encoded compressed images and parameters. The MPEG video decoder 445 decodes the video elementary stream. The MPEG video decoder 445 decodes the encoded compressed images and parameters in the video elementary stream, thereby generating decoded images containing raw pixel data.

The display engine 450 is responsible for and operable to scale the video picture, render the graphics, and construct the complete display among other functions. Once the display is ready to be presented, it is passed to a video encoder 455 where it is converted to analog video using an internal digital to analog converter (DAC). The digital audio is converted to analog in the audio digital to analog converter (DAC) 465. The display engine 450 prepares the images for display on a display screen.

The display engine 450 lags behind the MPEG video decoder 445 by a variable delay time. Because the display engine 450 lags behind the MPEG video decoder 445, the decoded images are buffered in image buffers 425a for display by the display engine 450. In order for the display engine 450 to accomplish its objective of being able to present the decoded images at their correct intended presentation time, the display engine 450 uses various parameters decoded by the MPEG video decoder 445.

In certain embodiments of the present invention, the CPU 490 uses the media metadata in the HTTP header 350 to configure the MPEG video decoder 445. Alternatively, the CPU 490 can simply provide the media metadata directly to the MPEG video decoder 445.

Figure 5:
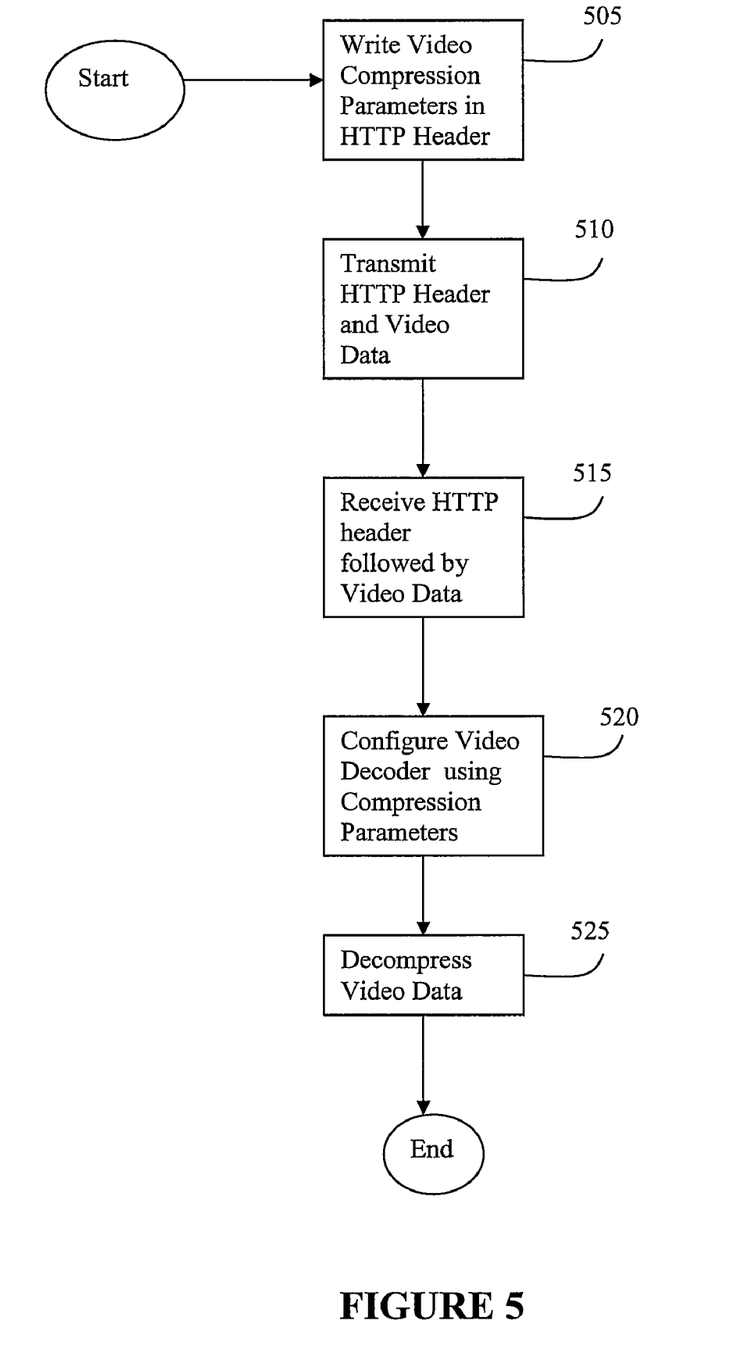
FIG. 5 is a flow diagram describing the transmission of data in accordance with an embodiment of the present invention.

Referring now to FIG. 5, there is illustrated a flow diagram for providing video data in accordance with an embodiment of the present invention. At 505, the video server 105 writes media metadata in the HTTP header 350. At 510, the video server 105 transmits the HTTP header 350, followed by the video data. At 515, the client 110 receives the HTTP header 350 and the video data. At 520, the CPU 490 uses the media metadata to configure the video decoder 445. At 520, the video decoder 445 decompresses the video data.

Embodiments as described herein may be implemented as a board level product, as a single chip, application specific integrated circuit (ASIC), or with varying levels of the decoder system integrated on a single chip with other portions of the system as separate components. The degree of integration of the monitoring system will primarily be determined by speed of incoming data, and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device wherein the flow charts described herein can be implemented as instructions in firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A method for transmitting data, said method comprising:
   receiving a request for video data from a client;
   transmitting a hypertext transmission protocol (HTTP) header to the client, said HTTP header comprising a presentation time stamp; and
   transmitting compressed video data to the client after transmitting the transaction header.

2. The method of claim 1, wherein the video data comprises packetized elementary stream headers, said packetized elementary stream headers comprising at least one field, and wherein the HTTP header also comprises the at least one field from the packetized elementary stream headers.

3. The method of claim 1, wherein the video data comprises transport packet headers, said transport packet headers comprising at least one field, and wherein the HTTP header also comprises the at least one field from the one transport packet headers.

4. The method of claim 1, further comprising:
receiving a request to change media channels.

5. A method for presenting video data, said method comprising:
examining an HTTP header;
retrieving a field from the HTTP header, wherein the field is duplicative of a field from either a transport header or a packetized elementary stream header; and
initializing decompression of video data based on the field from the HTTP header; and
wherein the field from the HTTP header comprises a time stamp indicating a time for presentation of at least a portion of the video data.

6. A method for transmitting data, said method comprising:
receiving a request for audio data from a client;
transmitting an HTTP header, said HTTP header comprising a presentation time stamp, to the client; and
transmitting compressed audio data to the client after transmitting the HTTP header.

* * * * *

UNITED STATES PATENT AND TRADEMARK OFFICE
CERTIFICATE OF CORRECTION

| | |
|---|---|
| PATENT NO. | : 7,890,986 B2 |
| APPLICATION NO. | : 11/765047 |
| DATED | : February 15, 2011 |
| INVENTOR(S) | : Rajakarunanayake |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 556 days.

Signed and Sealed this
Nineteenth Day of July, 2011

David J. Kappos
*Director of the United States Patent and Trademark Office*